Oct. 30, 1962   C. V. EVERETT ET AL   3,061,334
COUPLER MECHANISM
Filed Dec. 11, 1959
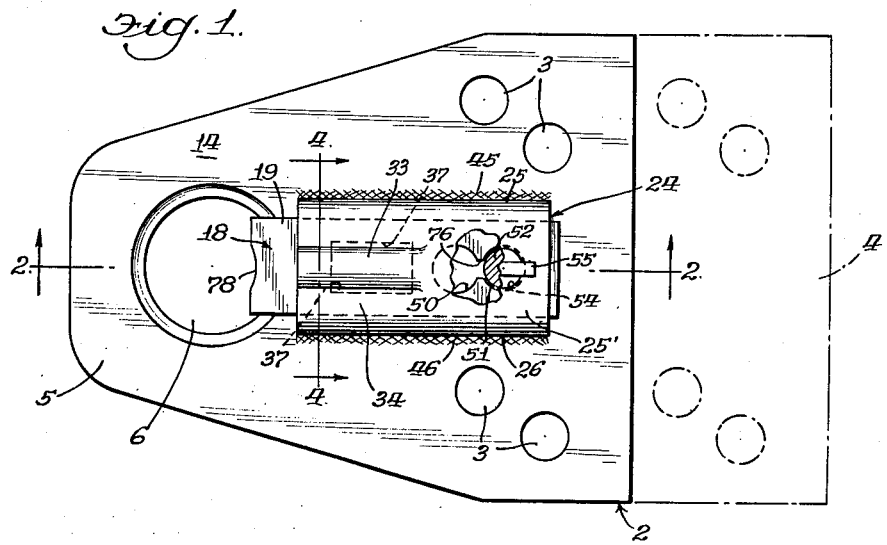
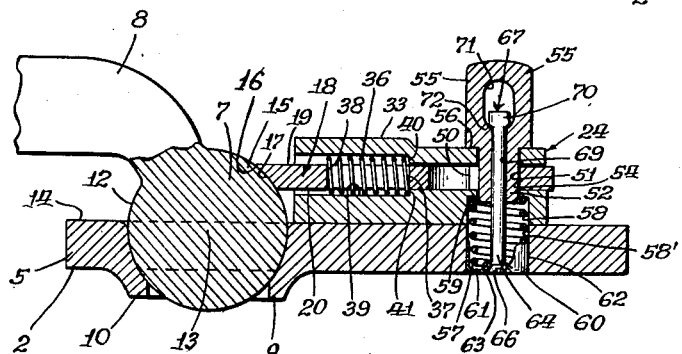
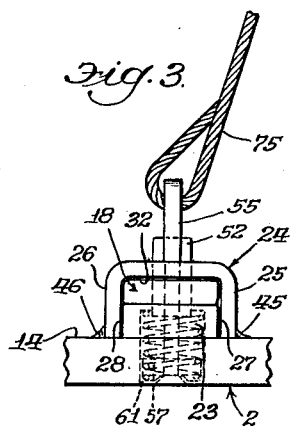
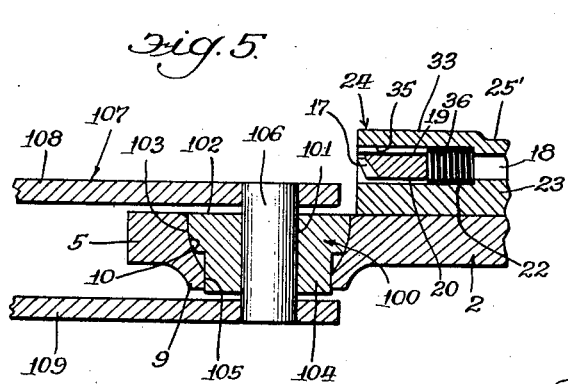
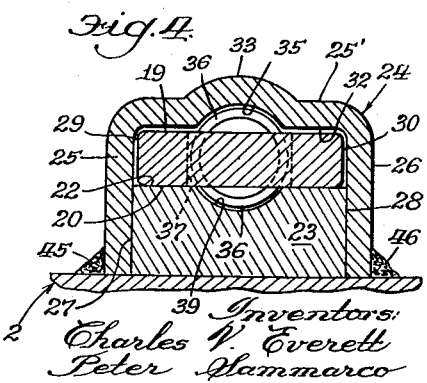
Inventors:
Charles V. Everett
Peter Sammarco
Paul O. Pippel  Atty.

United States Patent Office 3,061,334
Patented Oct. 30, 1962

1

3,061,334
COUPLER MECHANISM
Charles V. Everett, Warrenville, and Peter Sammarco, Bellwood, Ill., assignors to International Harvester Company, Chicago, Ill., a corporation of New Jersey
Filed Dec. 11, 1959, Ser. No. 858,992
4 Claims. (Cl. 280—513)

This invention relates to coupling mechanisms and more specifically to a novel mechanism wherein one of the coupling mechanisms is a ball and the other mating part is a socket.

A general object of the invention is to provide a novel, simple, rugged and efficient ball coupler assembly.

A still further object of the invention is to provide a novel coupler assembly wherein the socket portion is formed in a mounting plate for the coupler, the plate being of relatively thin section and the socket portion being of substantial depth thicker than the plate and formed by forging the same from the material which normally is within the hole formed in the plate portion.

A still further object of the invention is to provide a novel coupler wherein the mechanism is of simple and rugged form and is substantially foolproof in operation.

A still further object of the invention is to provide a novel coupling mechanism which in addition to serving as a ball coupler also by the use of a novel insert serves as a connection for an ordinary pin or swivel type hitch assembly.

These and other objects of the invention will become more apparent from the specification and the drawings wherein:

FIGURE 1 is a plan view of the novel coupler assembly with the ball removed;

FIGURE 2 is a longitudinal sectional view of the structure shown in FIGURE 1 illustrating the ball and assembly and in latched position;

FIGURE 3 is a fragmentary rear view;

FIGURE 4 is a cross-sectional view taken substantially on line 4—4 of FIGURE 1, and FIGURE 5 is a sectional view comparable to FIGURE 2 illustrating the insert assembly for the coupling socket.

Describing the invention in detail and having particular reference to the drawings, there is shown a hitch plate 2 which at one end is widened and provided with a series of securing holes 3 by means of which the plate 2 may be secured directly to an associated drawbar (not shown) or to an extension plate 4 for positioning the socket end 5 of the plate 2 at various locations rearwardly with respect to the drawbar.

The socket end of the hitch plate is formed with a vertical opening 6 for admitting a complemental ball 7 which by means of the neck 8 is attached to an associated implement or towed unit. A feature of the present invention is in the forming, by means of forging, of the socket which comprises the embossment 9 which is formed by upsetting the metal by coining or hot forming the opening 6 from the parent metal of the end 5 of the plate. The up setting of the metal forming the bead 9 affords a large spherical surface area indicated at 10, which is considerably deeper than the thickness of the plate, complementally engaging an extensive surface area of the periphery 12 of the ball 7.

As best seen in FIGURE 2, the ball 7 is seated within the socket 6 at a depth so that its center 13 is below the plane of the upper side 14 of the plate whereby the major portion of the bottom hemisphere of the ball is enclosed within the socket portion 8.

The upper hemisphere indicated at 15 projects above the top 14 of the plate 2. The top side of the ball is engaged as at 16 with a complementary arcuate surface 17 on the outer end of a latch 18 which is a flat generally

2 bar-like member having top and bottom sides 19 and 20, the side 20 seating on the top side 22 of a bottom support member 23 which fits within the inverted U-shaped channel forming a housing 24 for the latch 18, the channel having a top wall 25′ overlying the top side 19 of the latch member and having side flanges 25 and 26 which embrace the lateral sides 27 and 28 of the pillar or wear-block 23 as well as the lateral edges 29 and 30 of the latch member 18 for guiding the same within the guide slot 32 formed by and between the walls and flanges of the channel 24 and the pillar member 23.

It will be seen that the outer extremity of the top wall 25′ of the channel is offset centrally as at 33 and provides a pocket at 35 for the upper side of a compression spring 36 which is fitted within an aperture 37 in the tongue 18 intermediate its ends, the spring bearing at its forward end against the forward edge 38 of the slot 37 and its bottom side being nested in the pocket 39 formed by cutting out the top side 22 of the pillar member 23 which nests the bottom side of the spring. The rear or inner edge of the spring abuts against the seat portions 40 and 41 which are formed at the rear edge of the cavity 35 and at the rear edge of the cavity 39. Thus it will be seen that the spring 36 is held captive within the housing and interlocks the latch with the housing and biases the latch 18 outwardly into latching position.

It will be seen that the walls or flanges 25 and 26 of the housing member 24 are weld-connected as at 45 and 46 to the top side 14 of the hitch plate 2.

The latch 18 is provided with a pair of longitudinally spaced vertical openings 50 and 51 which are selectively adapted to register with the pin 52, the pin 52 upon entering the opening 50 holding the latch in retracted position and upon entering the opening 51, as seen in FIGURE 2, holding the latch in locked or coupled position to prevent withdrawal of the coupler ball. The pin 52 projects upwardly through an opening 54 in the wall 25′ of the housing and at its upper end is provided with an eye 55 which has a bottom edge 56 larger than opening 54 and serves as a stop for limiting downward movement of the pin 52 pursuant to the action of the spring 57 which is pocketed within the bore 58 formed in the plate 2 and a rear portion of the insert 23, the bore being vertically disposed and admitting the spring 57 and being terminated at its upper end in a shoulder 59 in port 23 against which the upper end of the spring seats and the spring seating at its lower end against a base 60 of a cup 61 which has a peripheral wall 62 fitting complementally within the lower end of the bore 58′ which is in plate 2 in vertical registry with bore 58. The cup is centrally apertured as at 63 and receiving a shank 64 therethrough and being countersunk about the opening 63 wherein the head 66 of the rivet generally indicated 67 seats. The shank 64 of rivet 67 extends through the spring 57 and up through a central bore 69 in the pin 52 and at its upper end 70 is peened to lock it within the opening 71 against the surface 72 therein. Thus it will be seen that the spring 57 and the pin are permanently locked in association with the assembly and that upon upward pulling of the pin by means of a rope or the like or cable indicated at 75 the pin 52 is adapted to be withdrawn from either opening 50 or 51 and in the position of FIGURE 2 upon pulling the pin 52 up, the ball may be withdrawn pursuant to the latch moving inwardly as accommodated by the slot at 76 between openings 50 to 51 which accommodates the shank 64 of rivet 67 therethrough as the latching bolt 18 is moved in and out.

It will be noted that the leading end 17 of the latch bolt 18 is notched at 78 centrally between its lateral edges and serves as a guide for the ball 7 as it enters into the socket vehicle urging the bolt into the housing.

FIGURE 5 illustrates a conversion assembly generally designated 100 comprising an insert member having a cylindrical central vertical aperture 101 and having an upper substantially semi-spherical portion 102 with a surface 103 in complementary engagement with the surface 10 of the socket, the member 100 having a lower generally cylindrical portion 104 in complementary engagement with the generally cylindrical surface 105 at the lower end of the socket, it being understood that the socket is open at its lower end. The opening 101 admits a pin 106 of a standard or conventional hitch clevis 107 which has upper and lower straps 108 and 109 which forms a conventional hitch assembly, it being understood that the remainder of the structure of the coupler is identical with that previously shown and identical parts are identified by corresponding reference numerals.

What is claimed is:

1. In combination with a ball, a coupler comprising a member having a vertical ball-admitting socket, a housing supported on said member, a filler block in the housing seated upon the member, a ball-engaging bolt in the housing slidable upon the block, said housing and block having opposing spring housing cavities and said bolt having a slot in transverse alignment with the cavities, a spring in the cavities seated at one end against a portion of the bolt and at the other end against an opposing portion of the housing urging the bolt to latching position over the socket and in engagement with the ball.

2. The invention according to claim 1 and said bolt having a rear portion with a pair of vertical openings therein, and a spring loaded pin assembly mounted in the housing and selectively positionable in said openings.

3. The invention according to claim 2 and said pin assembly comprising a lower portion of reduced diameter extending through said bolt and the block and securing the pin assembly to the housing and block, said bolt having a slot between the said openings admitting said reduced portion therein upon elevation of the pin assembly and movement of said bolt from a position aligning one of the openings with the pin assembly to a position registering the other opening with the pin assembly.

4. The invention according to claim 3 and said bolt having a front end with a ball-engaging guiding notch therein.

References Cited in the file of this patent

UNITED STATES PATENTS

| | | |
|---|---|---|
| 1,127,574 | Anderson | Feb. 9, 1915 |
| 1,281,049 | Menhall et al. | Oct. 8, 1918 |
| 1,340,521 | Cadman | May 18, 1920 |
| 1,435,182 | Shaw | Nov. 14, 1922 |
| 1,953,365 | Reetz | Apr. 3, 1934 |
| 2,078,851 | Hovey | Apr. 27, 1937 |
| 2,219,955 | Gilmore | Oct. 29, 1940 |
| 2,250,661 | Thorp et al. | July 29, 1941 |
| 2,355,695 | Attwood | Aug. 15, 1944 |
| 2,525,505 | Wiedman | Oct. 10, 1950 |
| 2,671,674 | Derksen | Mar. 9, 1954 |

FOREIGN PATENTS

| | | |
|---|---|---|
| 741,207 | Great Britain | Nov. 30, 1955 |